UNITED STATES PATENT OFFICE

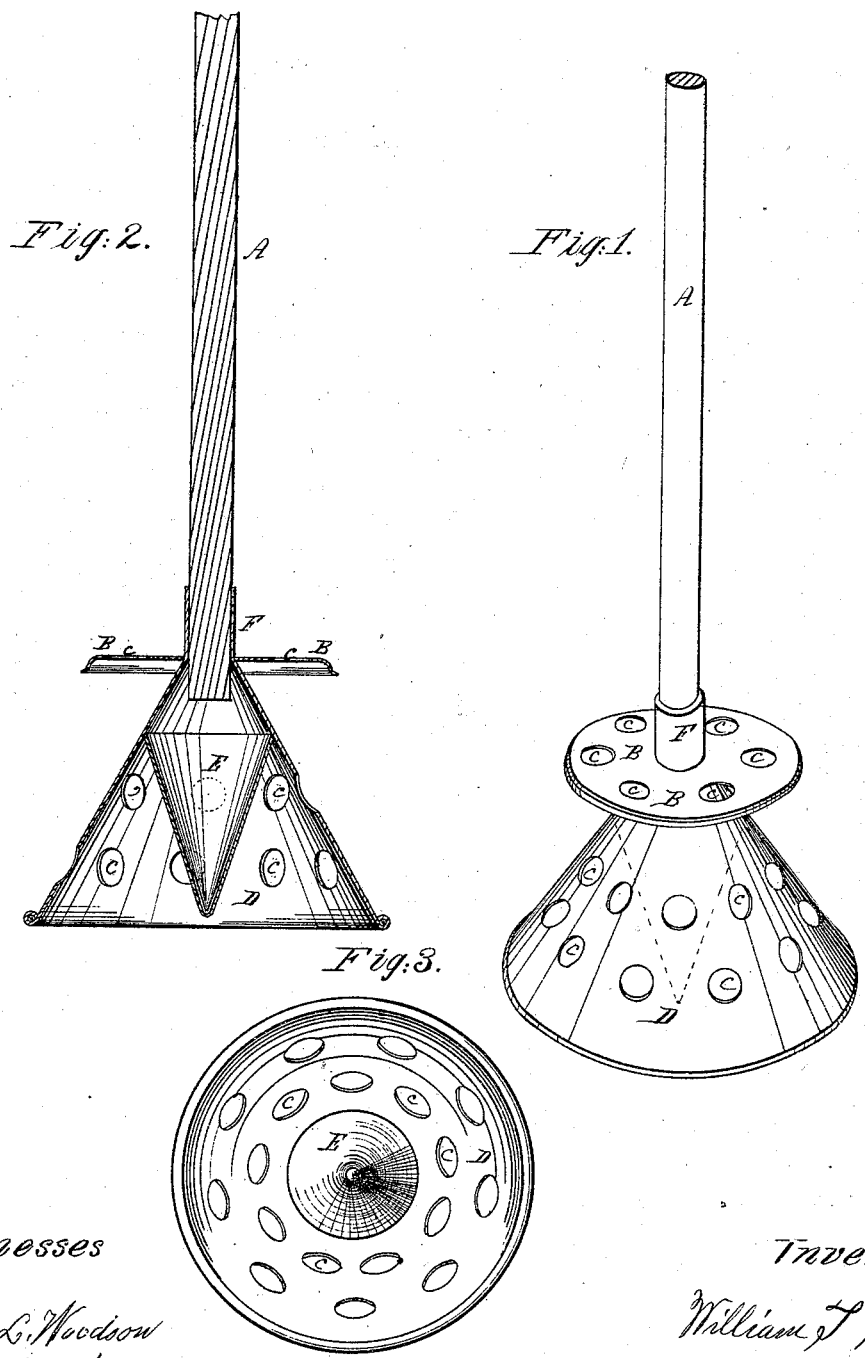

WILLIAM T. WRIGHT, OF WESTPORT, MISSOURI.

IMPROVEMENT IN RECIPROCATING CHURN-DASHERS.

Specification forming part of Letters Patent No. 147,730, dated February 17, 1874; application filed September 18, 1873.

*To all whom it may concern:*

Be it known that I, WILLIAM T. WRIGHT, of the town of Westport, in the county of Jackson, in the State of Missouri, have invented a new and Improved Churn-Dasher, to facilitate the forming and gathering of butter; and I do hereby declare that the following is a full and accurate description thereof, reference being had to the accompanying drawings and the letters of reference marked thereon.

Figure 1, perspective view; Fig. 2, vertical section; Fig. 3, inverted dasher.

This invention relates to an improvement on churn-dashers, wherein a perforated cone is fixed on the end of the dash-rod; and it consists in an inverted cone, which is centrally arranged inside of a perforated cone, for the purpose of scattering the milk outwardly while giving downward strokes to the dasher, as will be hereinafter explained.

In the annexed drawings, D represents a perforated cone, which is made of thin metal, and rigidly secured by its apex to one end of a dash-rod. There are two circular rows of holes, c, through the cone, which are arranged so as to leave above the upper row an air-space, in which air will be compressed at every downward stroke given to the dasher. Inside of the cone D is an imperforated cone, E, the base of which is upward. This inside cone E is very acute, and it is rigidly secured by its base to the cone D, so that its apex coincides with the center of the dash-rod. B designates a circular collar, which is rigidly secured around the socket-tube F of the cone D, and which is perforated, and also surrounded by a flange directed downwardly.

It will be seen from the above description that when the dasher is thrust into a body of milk the cone D will direct the currents inwardly and downwardly against the sides of the imperforated cone E, which latter will break up the currents, and direct them outwardly through the porforations c of the outer cone. When the dasher is quickly raised, the outer cone will direct the currents outwardly and upwardly, some of which will be broken by the perforated collar B, and directed back again upon the outer cone.

The internal cone E not only serves as a means for breaking up the currents which forcibly strike against it, but it also serves to scatter the currents in all directions, thereby greatly facilitating the production of the butter.

Having described my invention, I claim as new and desire to secure by Letters Patent—

The inner inverted and imperforated cone E, combined with the outer perforated cone D, substantially as and for the purposes described.

WILLIAM T. WRIGHT.

Witnesses:
B. L. WOODSON,
MILTON MOORE.